May 30, 1961 — T. W. WINSTEAD — 2,985,915

THERMOFORMING PROCESS FOR THERMOPLASTIC SHEETING

Filed Dec. 12, 1958 — 3 Sheets-Sheet 1

INVENTOR
Thomas W. Winstead

INVENTOR
Thomas W. Winstead

May 30, 1961  T. W. WINSTEAD  2,985,915
THERMOFORMING PROCESS FOR THERMOPLASTIC SHEETING
Filed Dec. 12, 1958  3 Sheets-Sheet 3

INVENTOR
Thomas W. Winstead
BY Raphael Semmes
ATTORNEY

United States Patent Office 2,985,915
Patented May 30, 1961

2,985,915

THERMOFORMING PROCESS FOR THERMOPLASTIC SHEETING

Thomas W. Winstead, Baltimore, Md., assignor to Hedwin Corporation, Baltimore, Md., a corporation of Maryland Filed Dec. 12, 1958, Ser. No. 780,163

11 Claims. (Cl. 18—19)

This invention relates to a thermoplastic sheet forming process primarily designed to facilitate control of thickness distribution in a formed article. More particularly, the invention consists in new and useful improvements in a thermoforming process for producing from a sheet of thermoplastic material, hollow articles such as containers or liners for liquid type fiber drums, where it is desired to provide selected reinforced or thickened wall areas in the liner to achieve improved performance at a minimum cost.

In recent years, the fiber drum has become a very important bulk container and because of its low cost as compared to metal drums of equal capacity, it has found many applications where it has replaced the heavier, more expensive metal drum. However, because of the fact that the fiberboard itself is not resistant to moisture and liquids, most of the uses to which fiber drums have been put have been in connection with dry materials.

In order to adapt fiber drums to the shipment of liquids and to render them as effective as the more expensive metal drums, various approaches have been undertaken, such, for example, as coating the inside of the drum or by laminating thermoplastic films to the paper from which the drum is made, before the paper is wound into the cylindrical side wall. Another approach to the problem has been to fabricate a separate liner from thermoplastic film which is then inserted into the completed fiber drum to act as a waterproof inner container which prevents the liquid contents from coming in contact with the inside of the fiber drum. Although this latter approach has been more satisfactory in some applications than the coating systems, experience has brought to light many inherent weaknesses which have resulted in the development of "pin holes" and other breaks in the film liner, thereby rendering the liner incapable of avoiding leakage and spoilage.

One of the most troublesome problems with bag-type liners has been the inadequate flex resistance of the synthetic films from which the liners have been fabricated and, as a result, when the liners have been creased or crinkled because of their inability to fit snugly in and around the various interior contours of the drum, flexing during shipment has resulted in creased areas which ultimately cause failure in the form of small holes and leakage of contents. Another disadvantage of liners heretofore employed, lies in the fact that on impact they have failed because they were too light to absorb the impact forces and pinching which frequently occurs at the bottom of the drum.

Inasmuch as experience with relatively thin liners, as well as liners made of heavier, more abrasion resistant material, have proven unsuccessful, a new approach has been necessary. The most logical approach was to provide a liner formed of a material sufficiently heavy to resist flex fatigue and preclude its flexing entirely during shipping vibration, by initially contouring the liner so that it is formed to fit snugly the inner surfaces of the fiber drum, to prevent folds or creases of any kind. However, it has been determined that a liner formed of this heavy material throughout its cross-section would undoubtedly be too costly to meet the economical requirements of such use.

Therefore, the solution of the problem appeared to lie in the provision of a liner designed with sufficient thickness from its top to slightly below the normal liquid level in a drum, to resist the type of flexing inherent in a bag liner, and with sufficient thickness at its bottom radius and sufficiently above the bottom to resist failure caused by impact or pinching during a severe drop of the filled drum on its bottom edge, and with thinner material between these two thickened portions where the need of heavy material is not present. By thus controlling the thickness distribution of the liner, the material cost would be reduced to a point where the liner could be economically and practically manufactured and used.

The primary object of the present invention is to provide a process and apparatus for producing drum liners or other hollow articles from thermoplastic sheeting, while controlling the thickness distribution of the sheeting and confining the thickened areas to certain predetermined or selected locations, thereby making possible the manufacture of low cost products with optimum strength and durability.

Another object of the invention is to provide a process for forming hollow articles and the like from thermoplastic sheeting wherein the wall thickness distribution is affected by chilling certain areas of a formed item by contact with mold surfaces, either internal or external, while avoiding the chilling of other portions by precluding contact with mold surfaces in these portions, so that the unchilled portions can subsequently be stretched or formed to further reduce the thickness of these areas.

A still further object of the invention is to provide a process of this nature where, in addition to cooling those portions of the thermoplastic sheet forming the upper and lower extremities of the ultimate hollow article, the intervening thin area can be provided with alternate thick and thin areas as may be required in the finished product, this latter thickness distribution being controlled by the use of a series of line contact discs or formers adapted to chill selected areas of the sheet being formed.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 1:
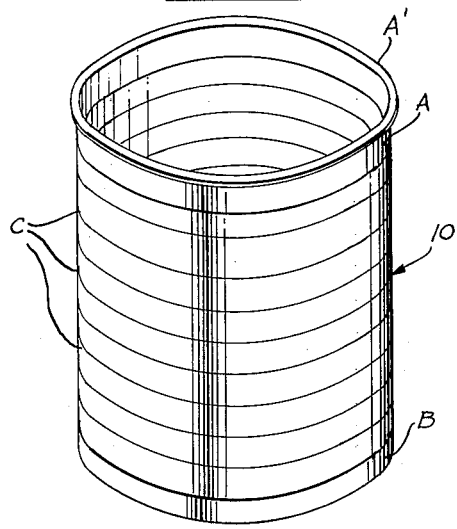
Figure 1 is a perspective view of one form of thermoplastic liner manufactured in accordance with this invention.
Figure 2:
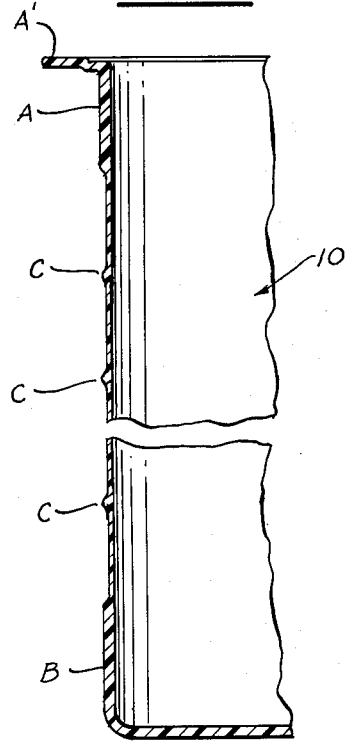
Figure 2 is an enlarged sectional view through the wall of the liner shown in Figure 1, illustrating the controlled thickness distribution in the finished product.

In the drawings, referring first to Figure 1, 10 generally represents a completed thermoplastic liner or insert of the type employed in a fiber shipping drum where it is desirable to have thickened wall areas both at the upper and lower extremities of the liner, as well as controlled thickness distribution in the intervening area. In the liner shown in Figure 1, the upper thickened area A is formed with an outwardly directed peripheral rim A' and the bottom thickened area B, forming the bottom of the liner, extends upwardly a predetermined distance, as best seen in Figure 2. Here it will also be seen that at spaced intervals between the top and bottom thickened portions A and B, the main cylindrical wall of the liner is provided with a series of annular thickened portions C, with intervening areas of reduced thickness.

As previously explained, the basic concept in providing this thickness distribution consists in chilling certain areas of the formed article by contact with mold surfaces, while avoiding the chilling of other portions thereof, by precluding contact with mold surfaces in these areas, so that the unchilled portion can subsequently be stretched or formed to further reduce the thickness of these areas. The form of apparatus illustrated in Figures 3 and 4 embodying a male type mold, comprises a cylindrical mold head 11 having an overlying and radially projecting supporting plate 12 thereon and an independently movable, concentric mold base 13, centrally supported on a piston rod 14. A fluid pressure cylinder 15, carrying a plunger or piston (not shown) is centrally fixed at a point above the mold head 11 and the piston rod 14 is operatively connected to the piston in the cylinder 15. A pressure tank 16 of any suitable type is connected to the upper and lower ends of the cylinder 15, by pressure lines 17 and 18 respectively, a suitable valve 19 being arranged to control the direction of movement of the piston in the cylinder 15 and thereby the direction of movement of the vertically movable mold base 13.

Thus, upon the application of pressure through line 17 to the upper end of the cylinder 15, the plunger therein is forced downwardly, causing the piston rod 14 and the mold base 13 connected thereto, to be extended downwardly to the position shown in Figure 4, as will later appear. Similarly, the application of pressure through line 18 causes the piston in cylinder 15 to be elevated, carrying with it the piston rod 14 and the mold base 13 which then is retracted to the position shown in Figure 3.

Both the mold head 11 and the mold base 13 are connected by any suitable means to a source of vacuum and are provided with a series of peripheral vacuum ports which serve a definite purpose during the molding operation to be later described. In the mold head, vacuum ports 20 are connected by vacuum lines 21 to a source of vacuum (not shown), while in the mold base 13, vacuum ports 22 are connected by vacuum lines 23 to said source of vacuum.

Figure 3:
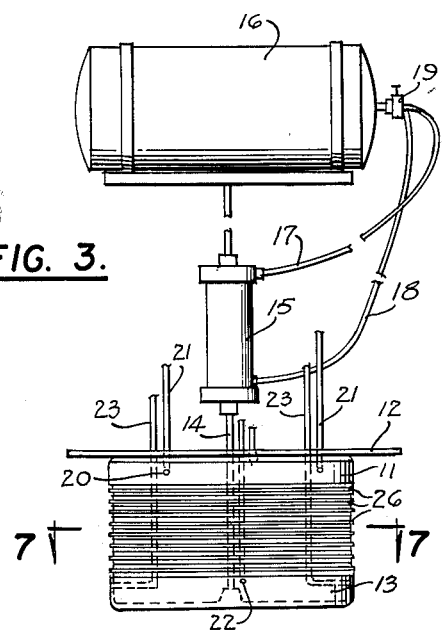
Figure 3 represents one form of apparatus which may be employed in molding or forming a cylindrical liner, the mold set being shown in its initial or unextended position.
Figure 4:
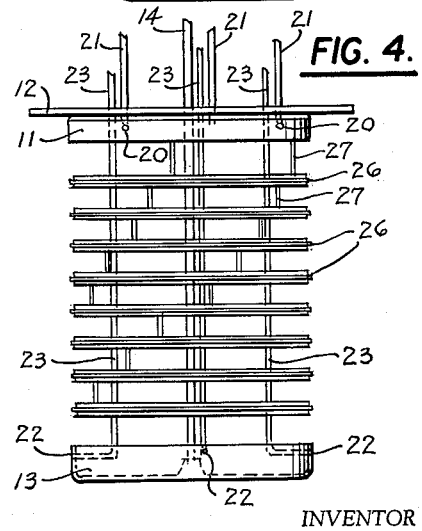
Figure 4 is a similar view of the mold set of Figure 3, but showing the device in extended position.
Figure 5:
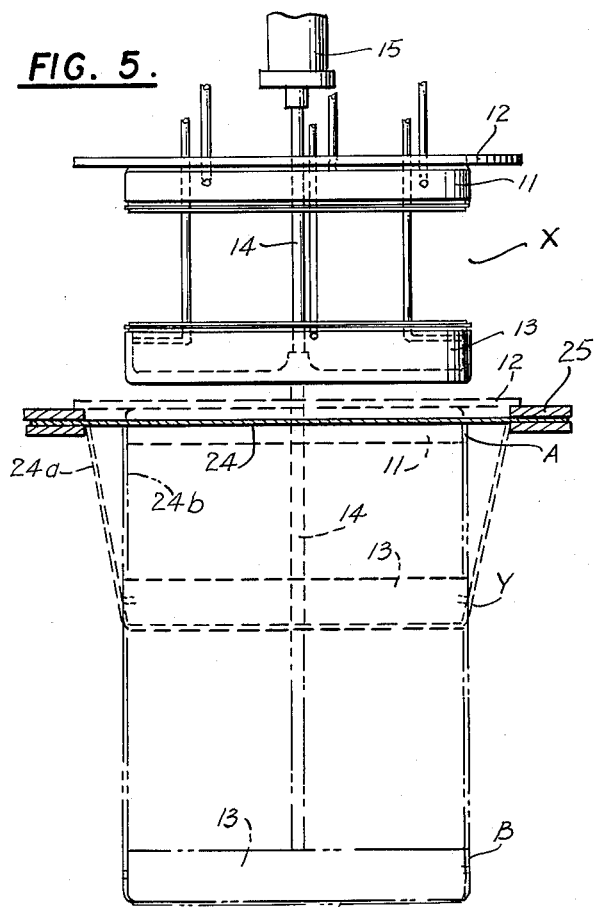
Figure 5 is a diagrammatic view illustrating the sequence of steps in practicing the invention.

Ignoring for the moment the series of discs shown in Figures 3 and 4, interposed between the mold head 11 and mold base 13, which represent a refinement of the present invention and are not a basic part thereof, the general operation of the mold set will be referred to, as diagrammatically shown in Figure 5. Here it will be seen that a sheet of thermoplastic material 24, such, for example, as polyethylene, having first been heated in a suitable oven to a forming temperature, is suspended in a frame 25, the central portion of which is open to receive the mold set which is initially located above the frame 25. Both the mold head 11 and mold base 13 may be cooled by any suitable means, such as circulating water or air therethrough. However, ordinarily at normal room temperature, these elements will be cooled sufficiently for the purposes of this process. The mold set with the mold base in retracted position as shown in Figure 5, is lowered as a unit from position X to position Y shown in dotted lines in Figure 5. During the course of this downward movement, the cooled mold base 13 contacts the central portion of the thermoplastic sheet 24 and this surface contact causes a sufficient chilling of that area of the sheet to fix the thickness thereof and prevent stretching of the chilled area. After the mold base 13 has reached position Y, both the mold head 11 and mold base 13 are subjected to a vacuum which draws the sheet 24 from the dotted line position shown at 24a, to that shown at 24b where it is retained by suction in peripheral contact with both the mold head 11 and mold base 13. This contact with the cooled mold head 11 chills the annular engaging portion of the sheet, thus forming two spaced chilled sections where the thickness of the sheet becomes fixed.

Thereafter, the manipulation of the valve 19 to effect the descent of the piston in cylinder 15 causes the mold base 13 to be extended downwardly away from the mold head 11 which, at this point, is prevented from further downward movement by contact of the plate 12 with the frame 25. Thus, the intervening area of the sheet 24, between the chilled upper and lower extremities, is stretched and thereby reduced in thickness.

When the complete length of the liner 10 has been attained, the intervening thinned area is also chilled either by the use of air or other suitable means, so as to set the thickness of the entire article. The mold set is then withdrawn by manipulation of valve 19 and cylinder 15, and the plastic liner is completed. Of course, the bounding edge of the sheet 24 adjacent the frame 25 is cut away to release the completed article.

In some instances, it is desirable, in addition to producing thickened top and bottom contoured areas of the final product, particularly in the manufacture of relatively deep liners or the like, to further distribute the thickness at intervals throughout the length of the wall of the liner. Thus, in Figures 3 and 4, the central portion of the mold set may be made up of a series of movable discs 26, arranged concentrically between the mold head 11 and the mold base 13. These discs are designed to make line contact only, with the surface of the liner in the process of being formed. In other words, the areas between the points of line contact do not come in contact with any surface and thereby remain relatively uncooled and subject to further stretching as will later appear. Each disc is preferably a laminated structure with the central lamina extending radially beyond the others to provide an annular line contact edge.

The particular arrangement of discs shown in the drawings is such as to permit the collapsing of the mold set with the coaxial discs in contact with one another except for the vertically spaced line contact edges as shown in Figure 3. In this position, when the sheet is initially stretched, the projecting spaced edges of the discs contact correspondingly spaced annular areas on the sheet which are chilled as in the case of the areas contacting the mold head and mold base. In the final extended position of the mold set as shown in Figure 4, the discs 26 become vertically spaced from one another and from the adjacent mold head and mold base, so that their projecting peripheral edges maintain cooling line contact with correspondingly spaced areas on the thermoplastic sheet being formed. In order to accomplish this spacing of the discs so as to effect a progressive stretching of selected areas of the sheet being formed, it is necessary to mount the discs in such a manner that they are sequentially separated, starting with the top disc and continuing until the elements are spaced as shown in Figure 4.

Figure 8:
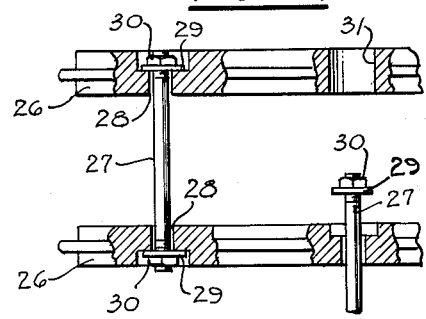
Figure 8 is an enlarged sectional view showing one form of line contact disc arrangement.
Figure 9:
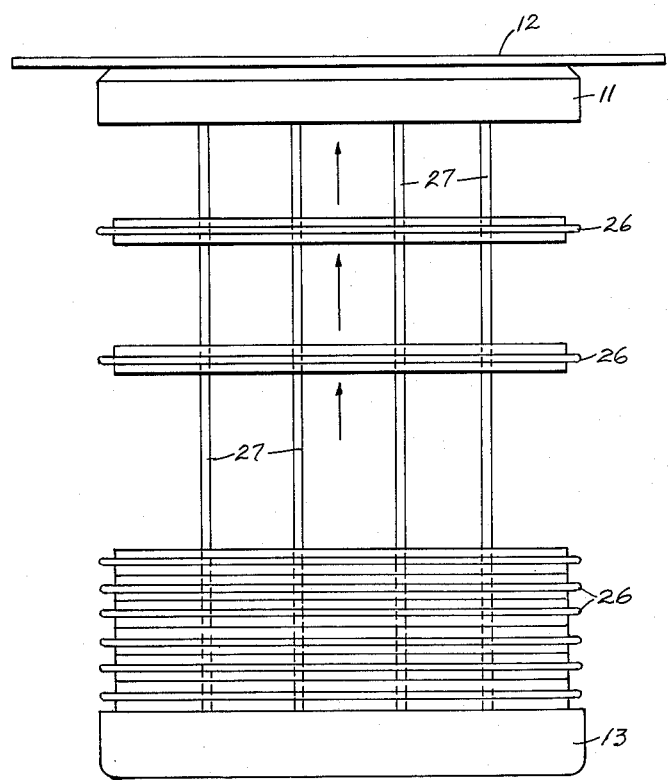
Figure 9 is a diagrammatic view illustrating the stretching operation which occurs between the positions of the apparatus as shown in Figures 3 and 4.

One example of a means for mounting these discs for sequential separation will best be seen by reference to Figure 8, considered in conjunction with Figure 4. Each of the discs is connected to the preceding and succeeding discs by means of a series of studs 27, slidably embracing openings 28 at annularly spaced intervals in the respective discs. The studs 27 are of a predetermined length to define the ultimate spacing of the discs and at each end are preferably provided with washers 29 adapted to overlie the boundaries of the openings 28, said washers being retained in place by nuts 30 on the threaded ends of the studs 27. Thus, each disc, when in extended position, is suspended from the disc next above and when in collapsed position, the studs, including the washers and nuts, are slidably accommodated by enlarged openings 31, arranged in adjacent discs as shown in Figure 8. Naturally, the stud accommodating openings 31 are aligned with one another so as to receive the full length of the respective studs when the discs are collapsed or nested into contacting relation.

With this arrangement, after the mold set has reached the position Y of Figure 5, and as the mold base is being extended to the full length of the final draw, the discs are successively moved in proportion to the stretch desired in any area between any two discs, the discs being progressively separated from one another, starting with the separation of the uppermost disc from the mold head 11. It will, of course, be understood that this uppermost disc is suspended from the mold head 11 by a set of studs 27 in a manner similar to that just described in connection with the suspension of the discs from one another.

Figure 7:
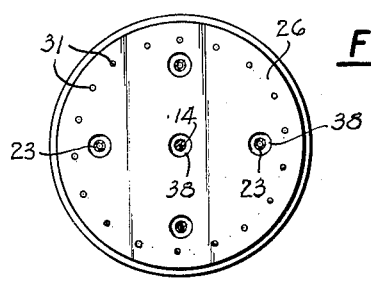
Figure 7 is a transverse sectional view taken on line 7—7 of Figure 3.

If the discs 26 are of solid construction, it is necessary to provide accommodating openings 38 at suitable aligned points for receiving the piston rod 14 and the vacuum lines 23 which lead to the mold base 13. Such an arrangement is illustrated in Figure 7.

Figure 6:
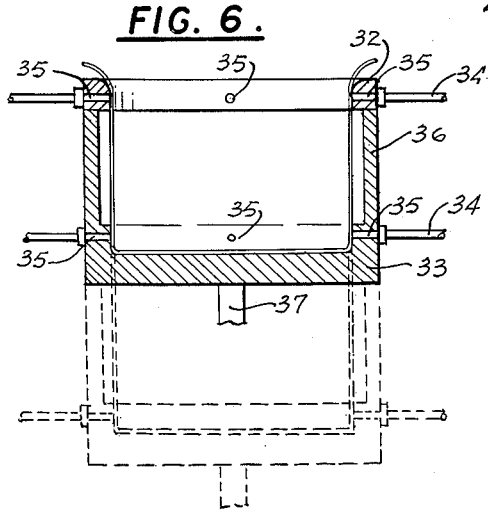
Figure 6 is a view showing a modified form of apparatus, namely a female type mold set.

As previously explained, instead of employing a male type mold set such as shown in Figures 3 and 4, a mold set of the female type may be used. An example of such a mold is shown in Figure 6 wherein the mold set comprises a mold head 32 in the form of an annular ring and a mold base 33 defining the contour of the bottom of the hollow article to be formed. The internal diameter of both the mold head 32 and base 33 determines the diameter at these points of the article being formed from the thermoplastic sheet 24, vacuum lines 34 being arranged in communication with the series of annularly spaced ports 35 in the inner peripheries of the mold head 32 and base 33, to suck the adjacent areas of the sheet 24 into contact with the mold head and base at these points.

The mold base 33 is provided with an upstanding annular shell 36 which, in the initial position of the mold set, contacts the lower edge of the annular mold head 32 as shown in full lines in Figure 6. The inner periphery of this shell 36 is spaced outwardly or off-set radially with respect to the inner peripheries of the mold head and mold base, so as to provide an area between these two which is out of contact with the thermoplastic sheet 24. Thus, when the sheet is first sucked into the mold set by applying vacuum to the mold head and mold base through vacuum lines 34 and ports 35, the sheet is drawn into the mold set with the upper extremity thereof in surface contact with the mold head 32 and the lower portion thereof in surface contact with the interior of the mold base 33. This surface contact as previously explained, causes a chilling of these contacting areas of the sheet, thereby fixing the thickness thereof. Then, by moving the mold base downwardly away from the mold head, as shown in dotted lines, the uncooled area of the sheet between the two thickened portions, is stretched downwardly to the desired length. After the forming operation has been completed, the entire article is cooled to set the thickness thereof throughout.

Any suitable means may be employed for causing the vertical movement of the mold base 33 to and from its initial contracted position shown in Figure 6. For example, either a hand or motor operated mechanism (not shown) may be attached to a downwardly extending leg 37 secured to the lower side of the mold base 33.

It will thus be apparent that the process herein described is adaptable for many uses where controlled thickness distribution is desired in the forming of articles from thermoplastic sheet and the like, the examples described above being purely illustrative of certain preferred uses. In all instances, the basic concept of the invention embodies the chilling of certain selected areas of an article being formed, by surface contact with mold surfaces, internal or external, while avoiding the chilling of other portions by precluding contact with mold surfaces in these areas, whereby the unchilled portions may subsequently be stretched or formed to further reduce the thickness of these areas.

It will be understood that the extent of movement of the mold head from the mold base, as well as the extent of spacing of the respective discs, determines the thickness of the formed sheet between any two chilled areas. By varying the spacing of the discs, the thickness of the area between the mold head and base may be correspondingly varied at selected points.

In both forms of the invention, it should be noted that the vacuum is sealed off from the non-contact areas when the sheet 24 engages the mold head and mold base, closing the respective vacuum ports therein.

From the foregoing, it is believed that the invention may be readily understood by those skilled in the art, without further description, it being borne in mind that numerous changes may be made in the details disclosed, without departing from the spirit of the invention as set forth in the following claims.

I claim:

1. A thermoforming process for producing alternately thickened and thinned areas in a sheet of thermoplastic material, comprising heating said sheet to a forming temperature, cooling selected spaced areas throughout said sheet by surface contact with correspondingly spaced cooled elements, sequentially stretching the intervening uncooled areas of said sheet until the sheet reaches a predetermined length, and cooling the formed sheet.

2. A thermoforming process for producing from a sheet of thermoplastic material, a hollow article having thickened wall portions at its longitudinal extremities, the intervening wall area having thickened portions at intervals spaced by portions of reduced thickness, said process comprising heating said sheet to a forming temperature, subjecting said heated sheet to a forming operation in a mold set having cooled portions at its extremities and at predetermined spaced intervals therebetween, effecting surface contact of selected areas of said sheet with said cooled portions to cool and fix the thickness of said areas, stretching the intervening uncooled areas of said sheet to complete the forming operation, and cooling the formed article.

3. A thermoforming process for producing from a sheet of thermoplastic material, hollow articles having thickened wall portions at their longitudinal extremities and controlled wall thickness distribution therebetween, comprising heating a sheet of said material to a forming temperature, and, while subjecting the same to a forming operation in a mold set, cooling said longitudinal extremities and selected spaced areas therebetween by surface contact with cooled portions of said mold set, stretching the intervening uncooled areas to complete the forming operation, and cooling the formed article.

4. A thermoforming process for producing from a sheet of thermoplastic material, hollow articles having thickened wall portions at their longitudinal extremities and controlled wall thickness distribution therebetween, comprising heating said sheet to a forming temperature, subjecting said heated sheet to a forming operation in a mold set, surface-contact cooling the portions of said sheet defining the upper and lower extremities of the article being formed, to fix the wall thickness thereof at such portions, surface-contact cooling selected space areas between said extremities, stretching the intervening uncooled areas of said sheet to complete the forming operation, and cooling the formed article.

5. A thermoforming process for producing from a sheet of thermoplastic material, hollow articles having controlled wall thickness distribution, comprising heating said sheet to a forming temperature, subjecting said heated sheet to a forming operation in a mold set, cooling the portions of said sheet defining the upper and lower extremities of said article, to fix the wall thickness thereof at such portions, cooling axially spaced areas around the intervening body portion of said article, sequentially stretching the intervening uncooled areas in said body portion until the article reaches a predetermined length, and cooling the completed article.

6. A process as claimed in claim 5, wherein the cooling of said portions forming the upper and lower extremities of said article and the axially spaced areas around the body portion thereof, is effected by surface contact with cooled portions of said mold set.

7. A thermoforming process for producing from a sheet of thermoplastic material, hollow articles having controlled wall thickness distribution, comprising heating a sheet of said material to a forming temperature, cooling the portions of said sheet defining the upper and lower extremities of the article, to fix the wall thickness thereof at such portions, while avoiding surface contact with the intervening area, cooling spaced areas in said intervening uncooled area, sequentially stretching the portions of said sheet between said spaced areas, and cooling the finished article.

8. Thermoforming apparatus for producing from a sheet of thermoplastic material, hollow articles having controlled thickness distribution, comprising a mold set including a mold head and a mold base, the latter being axially retractible and projectible with respect to said mold head, means for effecting surface contact of portions of said sheet with said mold head and mold base and selected spaced areas therebetween while avoiding surface contact with the intervening areas, to thereby cool said contacting areas, and means for projecting said mold base to stretch the intervening uncooled areas and thereby reduce their thickness, whereby the stretching of said uncooled areas is confined to the portions of the sheet between said cooled, spaced areas.

9. Apparatus as claimed in claim 8, including means for cooling selected spaced areas in said uncooled area prior to the projection of said mold base, whereby the stretching of said uncooled area is confined to the portions of the sheet between said cooled, spaced areas.

10. Apparatus as claimed in claim 8, wherein the means for cooling said spaced areas comprises a series of axially adjustable discs providing line contact members.

11. Thermoforming apparatus for producing from a heated sheet of thermoplastic material, hollow articles having controlled thickness distribution, comprising a mold set including a mold head and a mold base, the latter being axially retractible and projectible with respect to said mold head, a series of superimposed discs coaxially interposed between said head and base, an annular line contact sheet cooling edge projecting radially from each disc, said discs being axially collapsible between said head and base, means establishing a minimum axial spacing of respective contact edges when the discs are collapsed, means adjustably suspending each disc from the disc next above and for establishing a maximum spacing of respective contact edges when said mold base is projected, means for effecting surface-contact of portions of said sheet with said mold head, mold base and the line contact edges of said discs while avoiding surface-contact with the intervening areas, to thereby cool the contacting areas, and means for projecting said mold base and sequentially separating said discs to stretch the intervening uncooled areas of said sheet and thereby reduce its thickness.

References Cited in the file of this patent

UNITED STATES PATENTS

| | | |
|---|---|---|
| 2,297,645 | Bailey | Sept. 29, 1942 |
| 2,736,065 | Wilcox | Feb. 28, 1956 |
| 2,749,572 | Nowak | June 12, 1956 |
| 2,878,513 | Slaughter | Mar. 24, 1959 |

FOREIGN PATENTS

| | | |
|---|---|---|
| 200,129 | Australia | Nov. 2, 1955 |
| 209,544 | Australia | July 29, 1957 |
| 1,165,692 | France | Oct. 28, 1958 |